(12) United States Patent
Maki

(10) Patent No.: US 11,950,095 B2
(45) Date of Patent: Apr. 2, 2024

(54) COMMUNICATION APPARATUS AND METHOD FOR CONTROLLING THE SAME

(71) Applicant: CANON KABUSHIKI KAISHA, Tokyo (JP)

(72) Inventor: Nobuhiko Maki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/309,706

(22) Filed: Apr. 28, 2023

(65) Prior Publication Data

US 2023/0269585 A1   Aug. 24, 2023

Related U.S. Application Data

(63) Continuation of application No. 17/743,872, filed on May 13, 2022, now Pat. No. 11,678,185, which is a continuation of application No. 16/842,506, filed on Apr. 7, 2020, now Pat. No. 11,363,458, which is a continuation of application No. 15/778,092, filed as application No. PCT/JP2016/004954 on Nov. 25, 2016, now Pat. No. 10,652,741.

(30) Foreign Application Priority Data

Nov. 28, 2015 (JP) ................................ 2015-232515

(51) Int. Cl.
| | | |
|---|---|---|
| H04W 12/06 | (2021.01) | |
| G06F 3/12 | (2006.01) | |
| H04W 12/08 | (2021.01) | |
| H04W 12/30 | (2021.01) | |
| H04W 76/14 | (2018.01) | |
| H04W 84/12 | (2009.01) | |
| H04W 92/18 | (2009.01) | |
| H04W 12/73 | (2021.01) | |

(52) U.S. Cl.
CPC .......... *H04W 12/06* (2013.01); *G06F 3/1292* (2013.01); *H04W 12/08* (2013.01); *H04W 12/35* (2021.01); *H04W 76/14* (2018.02); *H04W 84/12* (2013.01); *H04W 92/18* (2013.01); *H04W 12/73* (2021.01)

(58) Field of Classification Search
None
See application file for complete search history.

(56) References Cited

U.S. PATENT DOCUMENTS

2016/0274834 A1* 9/2016 Fukasawa ............. G06F 3/1292

* cited by examiner

*Primary Examiner* — Suhail Khan
(74) *Attorney, Agent, or Firm* — Canon U.S.A., Inc. IP Division

(57) ABSTRACT

A communication apparatus automatically starts operating in a direct wireless communication mode in conjunction with a user's logging in to the communication apparatus.

14 Claims, 11 Drawing Sheets

FIG. 3A
300

LOG IN

PLEASE PLACE YOUR IC CARD OVER CARD READER, OR ENTER YOUR USER ID AND PASSWORD AND PRESS "LOG IN".

301 — USER ID: [ ]
302 — PASSWORD: [ ]

[ LOG IN ] — 303

FIG. 3B
310

MENU

311 — [ COPY ]    [ SEND ] — 312

313 — [ DIRECT WIRELESS COMMUNICATION ]    [ SETTINGS ] — 314

FIG. 3C
320

DIRECT WIRELESS SETTINGS

321 — · SSID SETTINGS
  ☑ FIXED SSID
      PLEASE ENTER SSID: [ ] — 322
  ☐ ONE-TIME SSID

323 — · TO BE IN CONJUNCTION WITH LOGGING IN
  ☑ IN CONJUNCTION WITH LOGGING IN
  ☐ NOT IN CONJUNCTION WITH LOGGING IN

[ REGISTER ] — 324

FIG. 4

| USER NAME | USER ID | PASSWORD |
|---|---|---|
| Tanaka | Tanaka1231 | 7bt89a |
| Sato | Sato1010 | yrj47m |
| Yamada | Yamada0707 | zrh2wh |

DIRECT WIRELESS CONNECTION

WHEN YOU PRESS "START" BUTTON, OPERATION IN ACCESS POINT MODE STARTS.

501 — [ START ]

DIRECT WIRELESS CONNECTION

PLEASE SELECT DISPLAYED SSID AND ENTER CONNECTION KEY. TO STOP OPERATION IN ACCESS POINT MODE, PLEASE PRESS "STOP" BUTTON.

511 ---
SSID: Direct-0001
CONNECTION KEY: 123456789

512 — [ STOP ]

| USER NAME | USER ID | PASSWORD | USER SSID | TO BE IN CONJUNCTION WITH LOGGING IN |
|---|---|---|---|---|
| Tanaka | Tanaka1231 | 7bt89a | Direct_2226_2966 | YES |
| Sato | Sato1010 | yrj47m | Direct_8219_1728 | YES |
| Yamada | Yamada0707 | zrh2wh | Direct_1428_8172 | NO |

COMMUNICATION APPARATUS AND METHOD FOR CONTROLLING THE SAME

CROSS-REFERENCE TO RELATED APPLICATIONS

This application is a continuation of U.S. application Ser. No. 17/743,872, which was filed on May 13, 2022 and which is a continuation of U.S. application Ser. No. 16/842,506, which was filed on Apr. 7, 2020 and which is a continuation of U.S. application Ser. No. 15/778,092, which has a § 371(c) date of May 22, 2018 and which is a National Stage Entry of PCT/JP2016/004954, which was filed on Nov. 25, 2016 and which claims priority to JP 2015-232515, which was filed on Nov. 28, 2015.

TECHNICAL FIELD

The present invention relates to a communication apparatus and a method for controlling the same.

BACKGROUND ART

Communication apparatuses such as smartphones, portable game machines, and printers have a wireless local area network (LAN) function. In the wireless LAN function, there is known a direct wireless communication mode of directly connecting a plurality of communication apparatuses without having an access point therebetween. PTL 1 discloses a configuration where a printer and a mobile terminal are directly connected using an access point mode, which is one example of the direct wireless communication mode. To use the direct wireless communication mode, the user needs to instruct a communication apparatus to start operating in the direct wireless communication mode. For example, the communication apparatus displays a "start button" for starting the operation in the direct wireless communication mode. When the user presses the "start button", the communication apparatus starts operating in the direct wireless communication mode.

There are communication apparatuses that have a user authenticating function. When the user places an integrated circuit (IC) card over an IC card reader included in such a communication apparatus or when the user enters his/her user ID and password to the communication apparatus, the communication apparatus executes user authentication. When the result of the user authentication is successful, the user who has been successfully authenticated logs in to the communication apparatus. The user who has logged in to the communication apparatus can use functions provided by the communication apparatus.

However, in such communication apparatuses of the related art, the user's logging in to the communication apparatus and the communication apparatus's starting operating in the direct wireless communication mode are not in conjunction with each other. That is, the user needs to separately do the job of logging in to the communication apparatus and the job of instructing the communication apparatus to start operating in the direct wireless communication mode, which is bothersome for the user.

CITATION LIST

Patent Literature

PTL 1: Japanese Patent Laid-Open No. 2015-023440

SUMMARY OF INVENTION

The present invention provides a communication apparatus including: a wireless communication unit configured to include a direct wireless communication function of performing wireless communication with an external device without having a relay device therebetween; and a controller configured to control the wireless communication unit to start the direct wireless communication function in response to a user's logging in to the communication apparatus when a first setting is configured on the communication apparatus, the first setting indicating that the direct wireless communication function is started in response to a user's logging in to the communication apparatus.

Further features of the present invention will become apparent from the following description of exemplary embodiments with reference to the attached drawings.

BRIEF DESCRIPTION OF DRAWINGS

FIG. 3A is a diagram illustrating a screen displayed by the printer.

FIG. 3B is a diagram illustrating a screen displayed by the printer.

FIG. 3C is a diagram illustrating a screen displayed by the printer.

FIG. 4 is a diagram illustrating a user management table.

FIG. 5A is a diagram illustrating a wireless connection screen.

FIG. 5B is a diagram illustrating a wireless connection screen.

FIG. 9 is a diagram illustrating a user management table.

DESCRIPTION OF EMBODIMENTS

Hereinafter, embodiments of the present invention will be described using the drawings. The following embodiments are not construed to limit the invention according to the appended claims, and all combinations of the features described in the embodiments are not necessarily required.

First Embodiment

Figure 1:
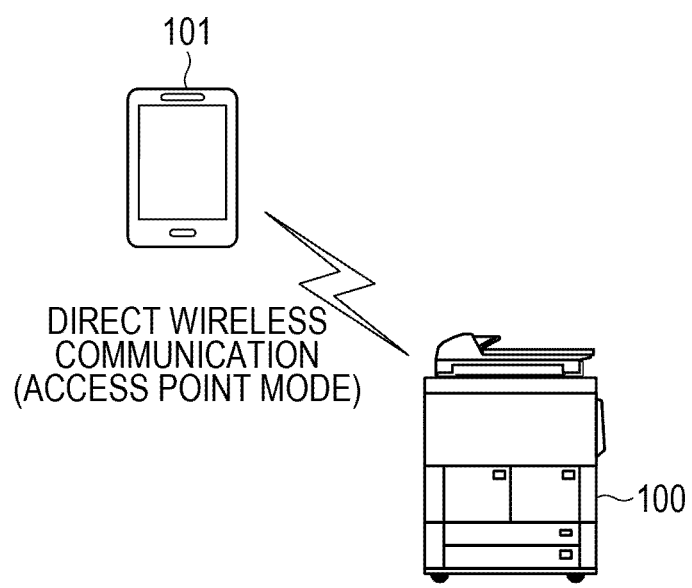
FIG. 1 is a diagram illustrating the outline of a communication system.

Referring to FIG. 1, the outline of a communication system will be described. The communication system according to a first embodiment includes a printer 100 and a mobile terminal 101.

The printer 100 has a wireless LAN function. The wireless LAN function of the printer 100 has two wireless communication modes, that is, an infrastructure mode and an access point mode. The infrastructure mode is a wireless communication mode where the printer 100 connects wirelessly to a relay device such as an access point (not illustrated) and communicates with a device such as a personal computer (PC) on a network.

In contrast, the access point mode is a wireless communication mode where a software access point is activated on the printer 100 and the printer 100 itself acts as an access point. The mobile terminal 101 such as a smartphone wirelessly connects to the printer 100 operating in the access point mode and transmits print data for printing an electronic file such as a photograph to the printer 100. With the access point mode, wireless communication can be established directly between the printer 100 and the mobile terminal 101, without having a relay device such as an access point therebetween. Note that the access point mode is an example of a direct wireless communication mode of establishing wireless communication directly between the printer 100 and the mobile terminal 101. Instead of the access point mode, other wireless communication systems such as Wi-Fi Direct (registered trademark) may be applied to the first embodiment.

The printer 100 has a user authenticating function, which will be described in detail later. The first embodiment is characterized in the point that the printer 100 starts operating in the access point mode in conjunction with the user's logging in to the printer 100 with the use of the user authenticating function.

Figure 2:
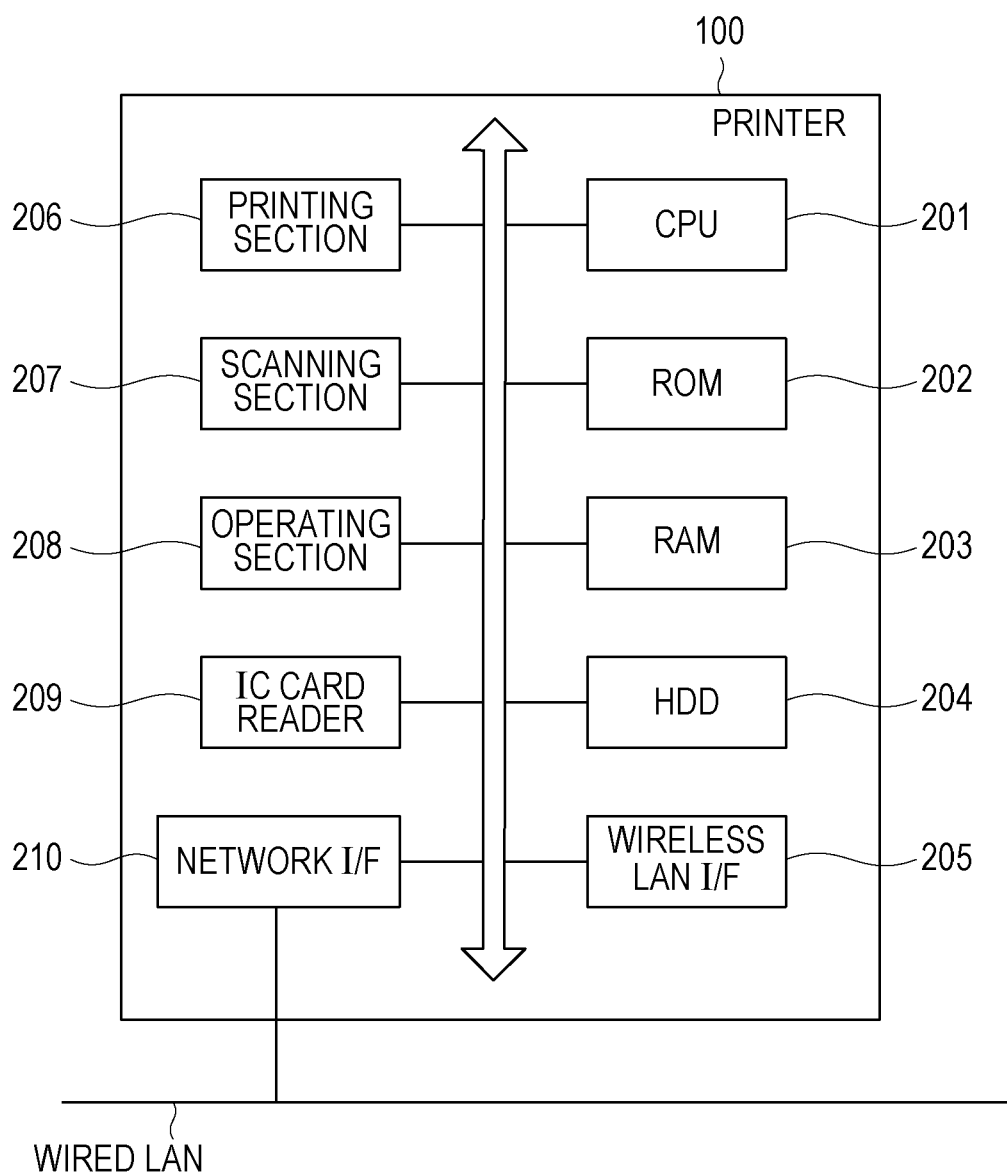
FIG. 2 is a diagram illustrating the hardware configuration of a printer.

Referring next to FIG. 2, the hardware configuration of the printer 100 will be described. A central processing unit (CPU) 201 reads a control program stored in a read-only memory (ROM) 202 and executes various processes for controlling the operation of the printer 100. The ROM 202 stores the control program. A random-access memory (RAM) 203 is used as a temporary storage area such a main memory or a work area for the CPU 201. A hard disk drive (HDD) 204 is a non-volatile storage medium for storing various types of data.

Although one CPU 201 executes processes illustrated in later-described flowcharts in the case of the printer 100, other modes are also conceivable. For example, a plurality of CPUs may cooperate to execute the processes illustrated in the later-described flowcharts. Alternatively, part or some of the processes illustrated in the later-described flowcharts may be executed using a hardware circuit such as an application-specific integrated circuit (ASIC).

A wireless LAN interface (I/F) 205 executes wireless LAN communication between the mobile terminal 101 and an external device such as an access point. Wireless LAN communication executed by the wireless LAN I/F 205 is wireless communication such as Institute of Electrical and Electronics Engineers (IEEE) 802.11 a/b/g/n/ac. The wireless LAN I/F 205 is operable in the infrastructure mode and the access point mode. The wireless LAN I/F 205 selects one of the infrastructure mode and the access point mode in accordance with device settings configured in advance by the user, and operates in the selected mode.

A network I/F 210 connects to a wired LAN via a LAN cable. The network I/F 210 is capable of communicating with an external device (such as a PC) on the wired LAN.

A printing section 206 executes printing on a sheet on the basis of print data received by the wireless LAN I/F 205 or the network I/F 210. A scanning section 207 scans a document placed by the user and generates a document image. The document image generated by the scanning section 207 is printed (so-called copied) by the printing section 206 or accumulated in the HDD 204.

An operating section 208 includes a liquid crystal display (LCD) with a touchscreen function and a keyboard, and displays various operation screens. The user can input instructions and information to the printer 100 via the operating section 208.

An IC card reader 209 reads user information from an IC card. In the case of the first embodiment, a user ID and a password are stored as user information in an IC card. The printer 100 executes user authentication on the basis of user information read by the IC card reader 209 from an IC card.

The printer 100 is given as an example of a communication apparatus operable in the access point mode. A communication apparatus to which the present invention is applicable is not limited to the printer 100. The present invention is applicable to various communication apparatuses including a digital camera, a camcorder, a smartphone, and a portable game machine as long as they are operable in the access point mode.

Next, operation screens provided by the printer 100 and operation procedures when the user uses the access point mode will be described.

A log-in screen 300 illustrated in FIG. 3A is a screen displayed by the operating section 208 of the printer 100. When the printer 100 is completely activated, the operating section 208 initially displays the log-in screen 300. The user places his/her IC card over the IC card reader 209.

A user management table 400 illustrated in FIG. 4 is information for managing user information (user name, user ID, and password) on a user who is permitted to log in to the printer 100, and is stored in the HDD 204 of the printer 100. A user who is registered in the user management table 400 can log in to the printer 100. When the user places his/her IC card over the IC card reader 209, the IC card reader 209 reads user information (user ID and password) from the IC card. The CPU 201 determines whether the user information, read by the IC card reader 209 from the IC card, is registered in the user management table 400. When the user information read from the IC card is registered in the user management table 400, the user authentication is successful, and the operating section 208 displays a menu screen 310 illustrated in FIG. 3B. The state becomes such that the user who has been successfully authenticated logs in to the printer 100 and can use the printer 100. In contrast, when the user information read from the IC card is not registered in the user management table 400, the user authentication failed, and the operating section 208 informs the user of the authentication failure and does not display the menu screen 310.

In the case of the first embodiment, the user may enter his/her user ID and password in an entry field 301 and an entry field 302, without using the IC card reader 209. When the user enters his/her user ID and password in the entry field 301 and the entry field 302 and presses a log-in button 303, the printer 100 executes user authentication.

The user management table 400 may be included not in the printer 100, but in an external authentication server. When the authentication server includes the user management table 400, the printer 100 transmits the user information to the authentication server. By receiving the result of the authentication (whether the authentication is successful or failed) from the authentication server, the printer 100 executes user authentication.

The menu screen 310 illustrated in FIG. 3B displays buttons for the user to use functions provided by the printer 100. A button 311 is a button for the user to use a copy function. When the user presses the button 311, the operating section 208 displays a copy screen (not illustrated).

A button 312 is a button for the user to use a send function (function of transmitting a document image generated by the scanning section 207 to an external device). When the user presses the button 312, the operating section 208 displays a send screen (not illustrated).

A button 314 is a button for the user to configure device settings of the printer 100. When the user presses the button 314, the operating section 208 displays various setting screens in accordance with the user operation. A setting screen 320 illustrated in FIG. 3C is one of the operation screens provided by the printer 100 to the user, and is displayed by the operating section 208. Items that can be set on the setting screen 320 will be described in detail. The setting screen 320 is a screen accessible to a user who has special privileges, such as a system administrator.

An item 321 is for setting which of a fixed service set identifier (SSID) and a one-time SSID is to be used as an SSID used in the access point mode. A fixed SSID is a setting that indicates that the same SSID is used whenever the printer 100 operates in the access point mode. The system administrator enters a desired SSID in an entry field 322. When operating in the access point mode, the printer 100 uses the SSID entered in the entry field 322 as a fixed SSID. In contrast, a one-time SSID is a setting that indicates that a random SSID is generated and that random SSID is used.

An item 323 is for setting whether to automatically start the operation in the access point mode in conjunction with the user's logging in. When "In conjunction with logging in" is set, the printer 100 automatically starts operating in the access point in conjunction with the user's logging in. In this case, the printer 100 automatically starts operating in the access point in conjunction with the user's logging in, without waiting for the user to press a later-described start button 501. In contrast, when "Not in conjunction with logging in" is set, the printer 100 does not automatically start operating in the access point in conjunction with the user's logging in.

A register button 324 is a button for reflecting the settings configured on the setting screen 320 in the printer 100. When the system administrator presses the register button 324, the results of the settings configured on the setting screen 320 are stored in the HDD 204, and the settings configured on the setting screen 320 are reflected in the printer 100.

The description now returns to the menu screen 310. A button 313 is a button for the user to use the access point mode. To use the access point mode, the user first presses the button 313.

A screen displayed after the user presses the button 313 is switched in accordance with the results of the settings configured on the setting screen 320. When "Not in conjunction with logging in" is set on the setting screen 320, the printer 100 does not start operating in the access point mode at a time point at which the user presses the button 313. Thus, the operating section 208 displays a wireless connection screen 500 illustrated in FIG. 5A in response to the user's pressing the button 313.

The wireless connection screen 500 displays the start button 501. The start button 501 is a button for the user to instruct the printer 100 to start operating in the access point mode. When the operating section 208 is displaying the wireless connection screen 500, the printer 100 has not started operating in the access point mode. Thus, even when the mobile terminal 101 searches for surrounding access points, the mobile terminal 101 cannot find the printer 100, and no wireless connection can be established between the mobile terminal 101 and the printer 100. To establish wireless connection between the mobile terminal 101 and the printer 100, the user needs to instruct the printer 100 to start operating in the access point mode. When the user presses the start button 501, the printer 100 starts operating in the access point mode. The operating section 208 displays a wireless connection screen 510 illustrated in FIG. 5B.

To operate in the access point mode, the printer 100 generates an SSID and a connection key (such as a Wired Equivalent Privacy (WEP) key). A field 511 of the wireless connection screen 510 displays the SSID and connection key generated by the printer 100. When it has been set on the setting screen 320 to use a fixed SSID, a fixed SSID is generated and displayed in the field 511. In contrast, when it has been set on the setting screen 320 to use a one-time SSID, a random SSID is generated and displayed in the field 511.

The user who has checked the details displayed in the field 511 uses his/her mobile terminal 101 to search for surrounding access points, and selects an access point with the SSID displayed in the field 511 from the search result list. When the user enters the connection key displayed in the field 511 to the mobile terminal 101, wireless connection based on the access point mode is established between the printer 100 and the mobile terminal 101. After wirelessly connecting the mobile terminal 101 to the printer 100 using the access point mode, the user selects on the mobile terminal 101 a photograph that the user wants to print. When the user inputs a print instruction to the mobile terminal 101, the mobile terminal 101 uses wireless communication in the access point mode to transmit print data for printing the photograph selected by the user to the printer 100. On receipt of the print data, the printer 100 executes printing based on the received print data on a sheet.

When the printer 100 starts operating in the access point mode, the printer 100 enters a standby state for receiving a request for establishing wireless connection from an external device such as the mobile terminal 101. When the printer 100 starts operating in the access point mode, the mobile terminal 101 can find the printer 100 when searching for surrounding access points. On receipt of a request from an external device for establishing wireless communication, the printer 100 establishes wireless connection in the access point mode with the external device. After establishing the wireless connection, actual data communication (such as transmission of print data from the mobile terminal 101 to the printer 100) is executed between the printer 100 and the external device.

The wireless connection screen 510 displays a stop button 512. The stop button 512 is for receiving from the user a stop instruction for stopping the operation in the access point mode. To stop the operation of the printer 100 in the access point mode, the user presses the stop button 512. When the user presses the stop button 512, the printer 100 stops operating in the access point mode. The printer 100 also stops operating in the access point mode when the user logs out from the printer 100.

In contrast, when "In conjunction with logging in" is set on the setting screen 320, the printer 100 has already started operating in the access point mode at a time point at which the user presses the button 313. Thus, the operating section 208 displays the wireless connection screen 510 illustrated in FIG. 5B in response to the user's pressing the button 313. When "In conjunction with logging in" is set on the setting screen 320, the printer 100 automatically starts operating in the access point mode in conjunction with the user's logging in to the printer 100, before the user presses the start button 501. For the user, the printer 100 starts operating in the access point when the user simply logs in to the printer 100; thus, the user need not additionally press the start button 501.

Figure 6:
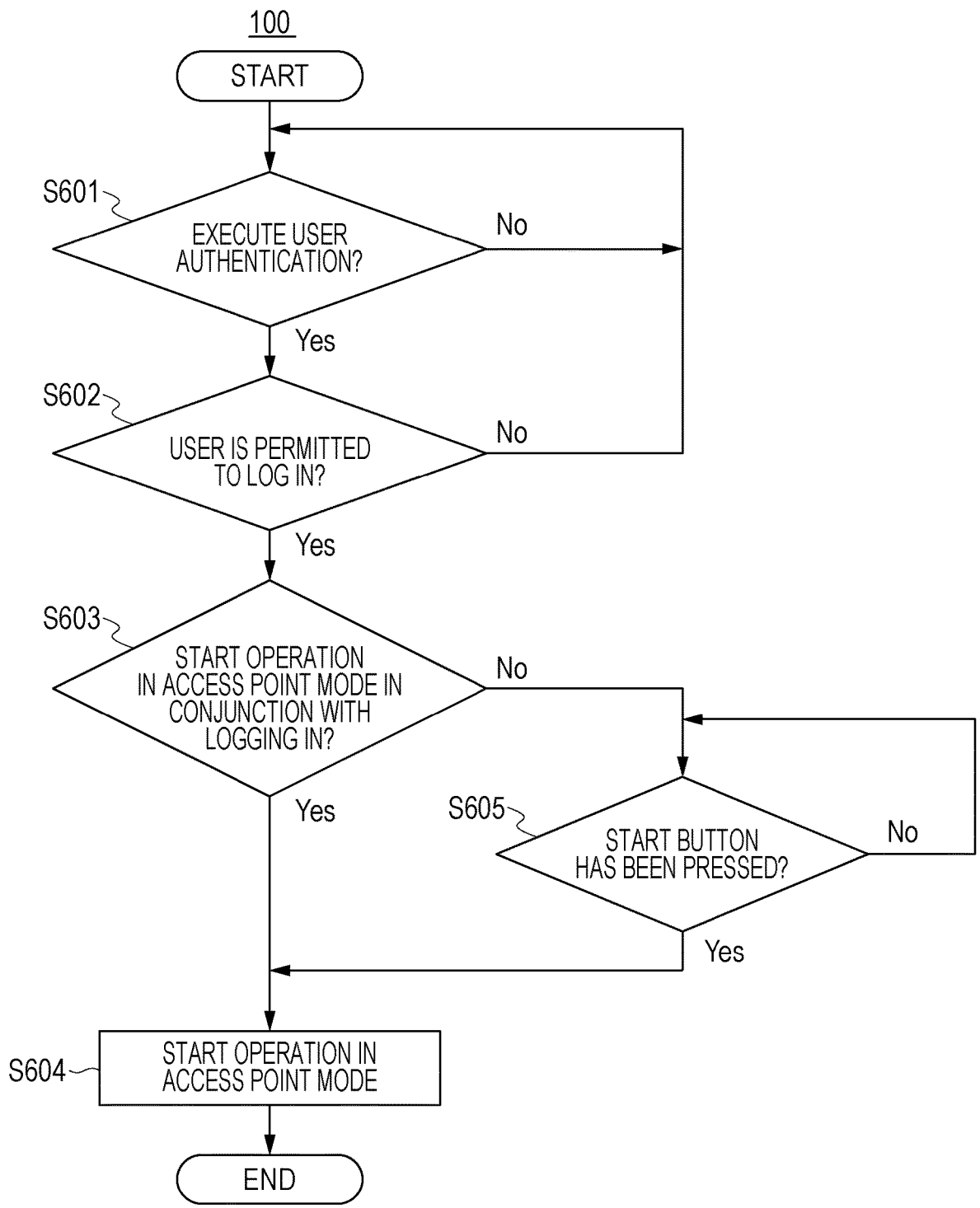
FIG. 6 is a flowchart illustrating a process of starting operation in an access point mode.

Next, a process executed by the printer 100 when the user logs in to the printer 100 and uses the access point mode will be described using a flowchart illustrated in FIG. 6. Each step illustrated in the flowchart in FIG. 6 is processed when the CPU 201 expands and executes a control program stored in a memory such as the ROM 202 or the like in the RAM 203. Alternatively, the printer 100 may be configured such that at least some of the steps of the flowchart illustrated in FIG. 6 are executed by the CPU 201, and the remaining steps are executed by a CPU (not illustrated) different from the CPU 201.

At first, in step S601, the CPU 201 determines whether to execute user authentication. When the IC card reader 209 reads user information from an IC card, or when the user enters his/her user ID and password in the entry field 301 and the entry field 302 and presses the log-in button 303, the CPU 201 determines to execute user authentication. The process proceeds to step S602.

Next in step S602, the CPU 201 determines whether a user indicated by the user information is a user who is permitted to log in. This determination is done by checking whether the user information is registered in the user management table 400. When the user information is registered in the user management table 400 (the user authentication is successful), the process proceeds to step S603. In contrast, when the user information is not registered in the user management table 400 (the user authentication failed), the process returns to step S601.

Next in step S603, the CPU 201 determines whether to start the operation in the access point mode in conjunction with the user's logging in. This determination is executed by checking the results of the settings configured on the setting screen 320. When "In conjunction with logging in" is set on the setting screen 320, it is determined in step S603 to start the operation in the access point mode in conjunction with the user's logging in, and the process proceeds to step S604. In step S604, the CPU 201 controls the wireless LAN I/F 205 to start the operation in the access point mode. The wireless LAN I/F 205 generates a fixed SSID or a one-time SSID in accordance with the results of the settings configured on the setting screen 320, and starts the operation in the access point mode. When "In conjunction with logging in" is set on the setting screen 320, the printer 100 automatically starts operating in the access point mode in conjunction with the user's logging in to the printer 100. This saves the user's workload.

In contrast, when "Not in conjunction with logging in" is set on the setting screen 320, it is determined in step S603 not to start the operation in the access point mode in conjunction with the user's logging in, and the process proceeds to step S605. In step S605, the CPU 201 determines whether the user has pressed the start button 501. When the CPU 201 detects that the user has pressed the start button 501, the process proceeds to step S604. In step S604, the CPU 201 controls the wireless LAN I/F 205 to start the operation in the access point mode. When "Not in conjunction with logging in" is set, the printer 100 does not start operating in the access point mode at a time point at which the user logs in.

Figure 7:
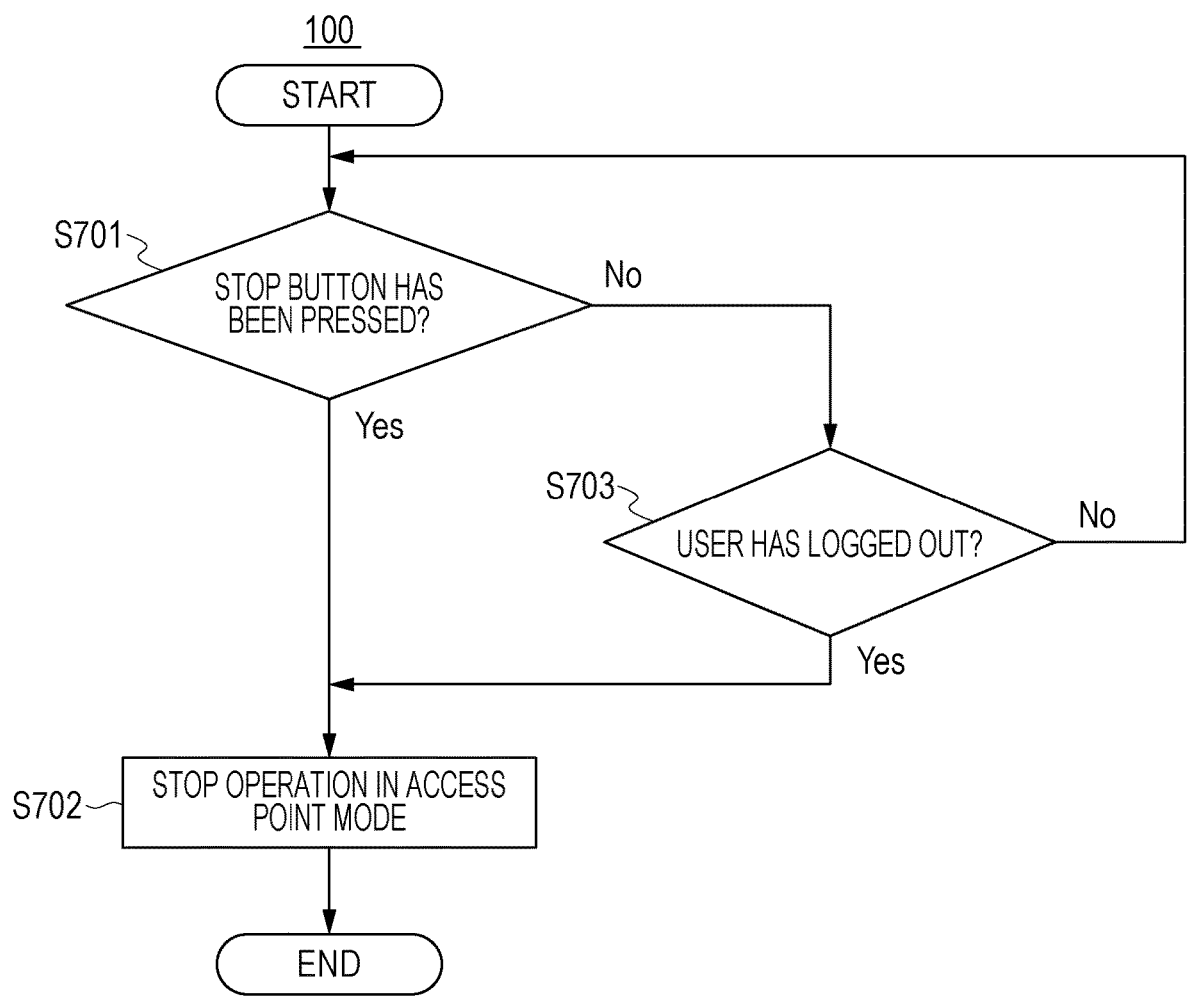
FIG. 7 is a flowchart illustrating a process of stopping operation in the access point mode.

Next, a process executed by the printer 100 for stopping the operation in the access point mode will be described using a flowchart illustrated in FIG. 7. Each step illustrated in the flowchart in FIG. 7 is processed when the CPU 201 expands and executes a control program stored in a memory such as the ROM 202 or the like in the RAM 203. Alternatively, the printer 100 may be configured such that at least some of the steps of the flowchart illustrated in FIG. 7 are executed by the CPU 201, and the remaining steps are executed by a CPU (not illustrated) different from the CPU 201.

At first, in step S701, the CPU 201 determines whether the user has pressed the stop button 512. When the CPU 201 detects that the user has pressed the stop button 512, the process proceeds to step S702. In step S702, the CPU 201 controls the wireless LAN I/F 205 to stop the operation in the access point mode, and the wireless LAN I/F 205 stops the operation in the access point mode.

In contrast, when the CPU 201 determines in step S701 that the user has not pressed the stop button 512, the process proceeds to step S703. In step S703, the CPU 201 determines whether the user has logged out from the printer 100. When the user has logged out (such as when the user has pressed a log-out button (not illustrated)), the CPU 201 determines in step S703 that the user has logged out, and the process proceeds to step S702. In step S702, the CPU 201 controls the wireless LAN I/F 205 to stop the operation in the access point mode, and the wireless LAN I/F 205 stops the operation in the access point mode. In other words, the printer 100 automatically stops operating in the access point mode in conjunction with the user's logging out. In contrast, when the CPU 201 determines in step S703 that the user has not logged out, the process returns to step S701.

In the case of the printer 100, the wireless LAN I/F 205 operates in one of the infrastructure mode and the access point mode, and is incapable of simultaneously operating in both the infrastructure mode and the access point mode. Thus, when the wireless LAN I/F 205 is operating in the access point mode, the wireless LAN I/F 205 can neither operate in the infrastructure mode nor receive print data from a PC via an external access point mode. Therefore, in the first embodiment, the wireless LAN I/F 205 automatically stops the operation in the access point mode in conjunction with the user's logging out. The fact that the user has logged out can be determined that the user's use of the access point mode has ended. By automatically stopping the operation in the access point mode in conjunction with the user's logging out, the operation mode of the wireless LAN I/F 205 can be switched from the access point mode to the infrastructure mode.

As has been described above, according to the first embodiment, the printer 100 automatically starts operating in the access point in conjunction with the user's logging in. For the user, the user no longer need to separately do the job of logging in to the printer 100 and the job of inputting an instruction to start the operation in the access point mode to the printer 100. This saves the user's workload and enhances convenience.

The mobile terminal 101 stores the SSID of an access point to which the mobile terminal 101 was connected in the past as a connection log. The mobile terminal 101 has the function of, when the mobile terminal 101 finds an access point with an SSID stored in the connection log, automatically establishing wireless connection with the access point. Thus, when the user has once connected his/her mobile terminal 101 to the printer 100 using the access point mode, wireless connection in the access point mode can be established between the mobile terminal 101 and the printer 100 in conjunction with the user's logging in. For the user, the mobile terminal 101 can transmit print data to the printer 100 when the user simply logs in to the printer 100. This enhances convenience.

According to the first embodiment, the printer 100 automatically stops operating in the access point in conjunction with the user's logging out. For the user, the operation in the access point mode can be stopped at a time point at which the user logs out from the printer 100, without being conscious of stopping the operation in the access point mode. The printer 100 can switch the operation mode of the wireless LAN I/F 205 from the access point mode to the infrastructure mode in conjunction with the user's logging out.

Second Embodiment

In the first embodiment, when "In conjunction with logging in" is set on the setting screen 320, the printer 100 uniformly starts operating in the access point mode in conjunction with the user's logging in. In contrast, according to the second embodiment, a process of switching, on the basis of settings regarding the access point mode, whether to automatically start the operation in the access point mode in conjunction with the user's logging in will be described. The configuration of the printer 100 is the same as that in the first embodiment.

A mobile terminal stores the SSID of an access point to which the mobile terminal was connected in the past as a connection log. When the mobile terminal finds an access point with an SSID stored in the connection log, the mobile terminal wirelessly connects to the access point. When the printer 100 is using a fixed SSID in the access point mode, there may be cases where a mobile terminal that has wirelessly connected to the printer 100 in the past stores this fixed SSID in the connection log. In such cases, when the printer 100 starts operating in the access point mode in conjunction with the user's logging in and uses the fixed SSID, it is highly likely that another surrounding mobile terminal establishes wireless connection with the printer 100 prior to the user of the printer 100. Because the number of concurrent connections is limited for wireless connection in the access point mode, if a plurality of other mobile terminals first connect to the printer 100, the user of the printer 100 cannot connect his/her mobile terminal to the printer 100.

Therefore, the printer 100 according to the second embodiment is characterized in the point that, when an SSID used in the access point mode is not a fixed SSID but is a one-time SSID, the printer 100 automatically starts operating in the access point mode in conjunction with the user's logging in.

Figure 8:
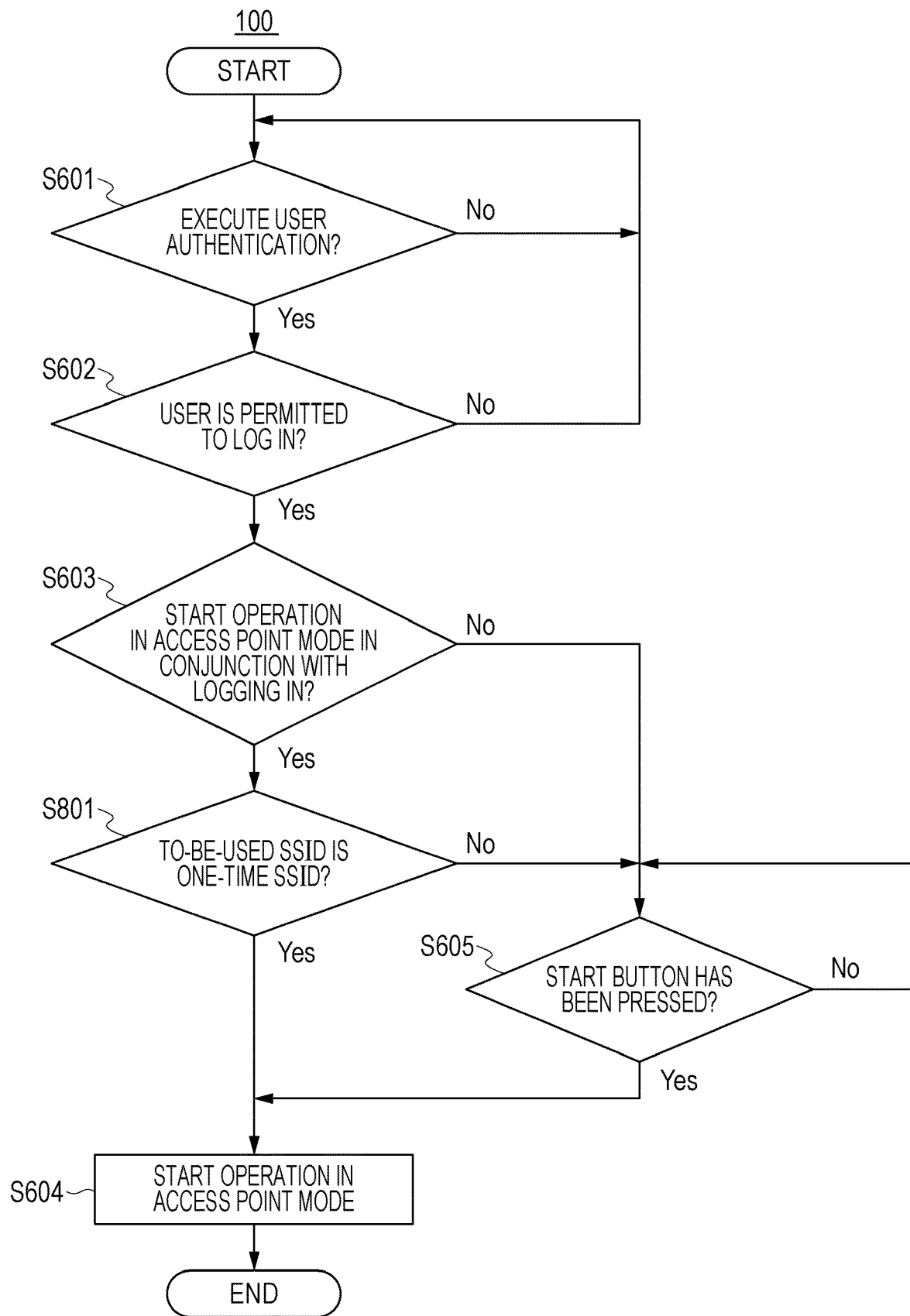
FIG. 8 is a flowchart illustrating a process of starting operation in the access point mode.

Next, a process executed by the printer 100 when the user logs in to the printer 100 and uses the access point mode will be described using a flowchart illustrated in FIG. 8. Each step illustrated in the flowchart in FIG. 8 is processed when the CPU 201 expands and executes a control program stored in a memory such as the ROM 202 or the like in the RAM 203. Alternatively, the printer 100 may be configured such that at least some of the steps of the flowchart illustrated in FIG. 8 are executed by the CPU 201, and the remaining steps are executed by a CPU (not illustrated) different from the CPU 201. The processing in, among the steps of the flowchart in FIG. 8, steps with the same step numbers as those in the flowchart in FIG. 6 is identical to that described in FIG. 6, and accordingly descriptions thereof will be omitted.

In step S603, the CPU 201 determines whether to start the operation in the access point mode in conjunction with the user's logging in. When the CPU 201 determines in step S603 to start the operation in the access point mode in conjunction with the user's logging in, the process proceeds to step S801.

In step S801, the CPU 201 determines whether an SSID used in the access point mode is a one-time SSID. This determination is executed by checking the results of the settings configured on the setting screen 320. When an SSID used in the access point mode is a one-time SSID, the process proceeds to step S604. In step S604, the CPU 201 controls the wireless LAN OF 205 to start the operation in the access point mode. The wireless LAN I/F 205 generates a one-time SSID and starts the operation in the access point mode. When using a one-time SSID, the printer 100 generates a random SSID. It is very unlikely that surrounding mobile terminals store this randomly generated SSID as their connection logs by chance. Therefore, according to the second embodiment, when an SSID used in the access point mode is a one-time SSID, the printer 100 automatically starts operating in the access point mode in conjunction with the user's logging in.

In contrast, when the CPU 201 determines in step S801 that an SSID used in the access point mode is not a one-time SSID, the process proceeds to step S605. In step S605, the CPU 201 determines whether the user has pressed the start button 501. When an SSID used in the access point mode is a fixed SSID, the printer 100 does not automatically start operating in the access point mode in conjunction with the user's logging in, and waits until the user presses the start button 501. In doing so, even when other surrounding mobile terminals store the fixed SSID as their connection logs, the possibility of the user's mobile terminal failing in wirelessly connecting to the printer 100 using the access point mode can be reduced.

As has been described above, according to the second embodiment, whether to automatically start the operation in the access point mode in conjunction with the user's logging in can be switched on the basis of the type of SSID used in the access point mode. Specifically, the printer 100 automatically starts operating in the access point mode in conjunction with the user's logging in on condition that the settings regarding the access point mode include a one-time SSID. In contrast, the printer 100 does not automatically start operating in the access point mode in conjunction with the user's logging in on condition that the settings regarding the access point mode include a fixed SSID.

According to the second embodiment, like the process described using the flowchart in FIG. 7, the printer 100 automatically stops operating in the access point in conjunction with the user's logging out.

Third Embodiment

As a further modification, a third embodiment will be described. In the third embodiment, a user SSID issued for each user is used, in addition to a fixed SSID and a one-time SSID. The configuration of the printer 100 is the same as that in the first embodiment.

A user SSID will be described. A user SSID is an SSID issued for each user. When a user logs in to the printer 100 and the printer 100 starts operating in the access point mode, the printer 100 uses a user SSID issued for the user who is currently logged in. For example, when a user A is currently logged in, the printer 100 uses a user SSID for the user A; and, when a user B is currently logged in, the printer 100 uses a user SSID for the user B.

A user management table 900 illustrated in FIG. 9 is information for managing user information on a user who is permitted to log in to the printer 100, his/her user SSID, and information for determining whether to operate in conjunction with logging in, and is stored in the HDD 204 of the printer 100. The user information corresponds to a user name, a user ID, and a password. According to the user management table 900, it is seen that the user SSID "Direct 2226_2966" is prepared for the user "Tanaka". Whether to operate in conjunction with logging in is separately set by each user on a later-described setting screen 1010.

Figure 10A:
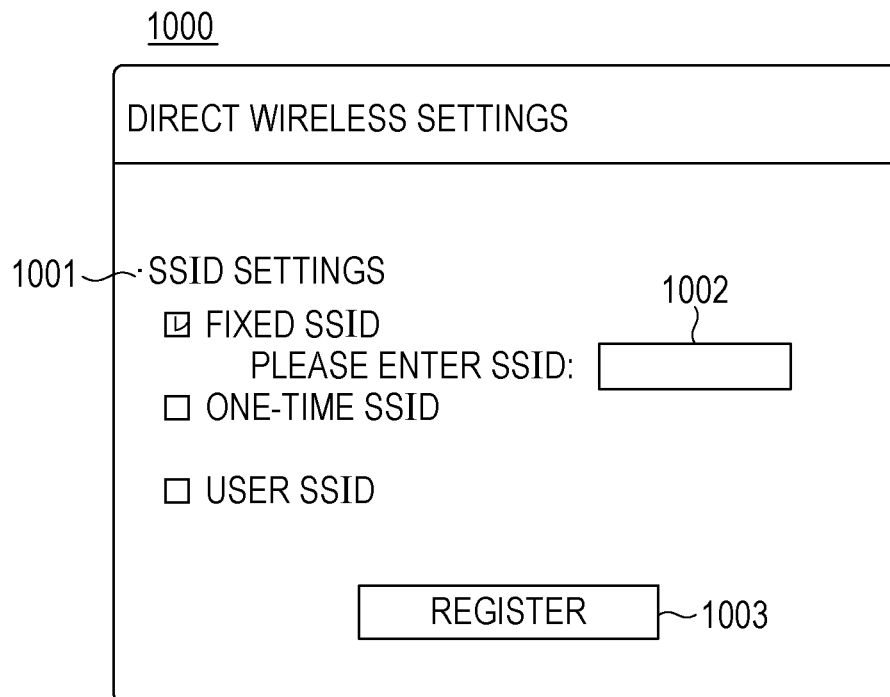
FIG. 10A is a diagram illustrating a wireless connection screen.

A setting screen 1000 illustrated in FIG. 10A is a screen for setting the type of SSID used in the access point mode and is displayed by the operating section 208. The setting screen 1000 is a screen accessible to a user who has special privileges, such as a system administrator.

An item 1001 is for setting which of a fixed SSID, a one-time SSID, and a user SSID is to be used as an SSID used in the access point mode. In the case of using a fixed SSID, the system administrator enters a desired SSID in an entry field 1002. A register button 1003 is a button for reflecting the settings configured on the setting screen 1000 in the printer 100. When the system administrator presses the register button 1003, the results of the settings configured on the setting screen 1000 are stored in the HDD 204, and the settings configured on the setting screen 1000 are reflected in the printer 100.

Figure 10B:
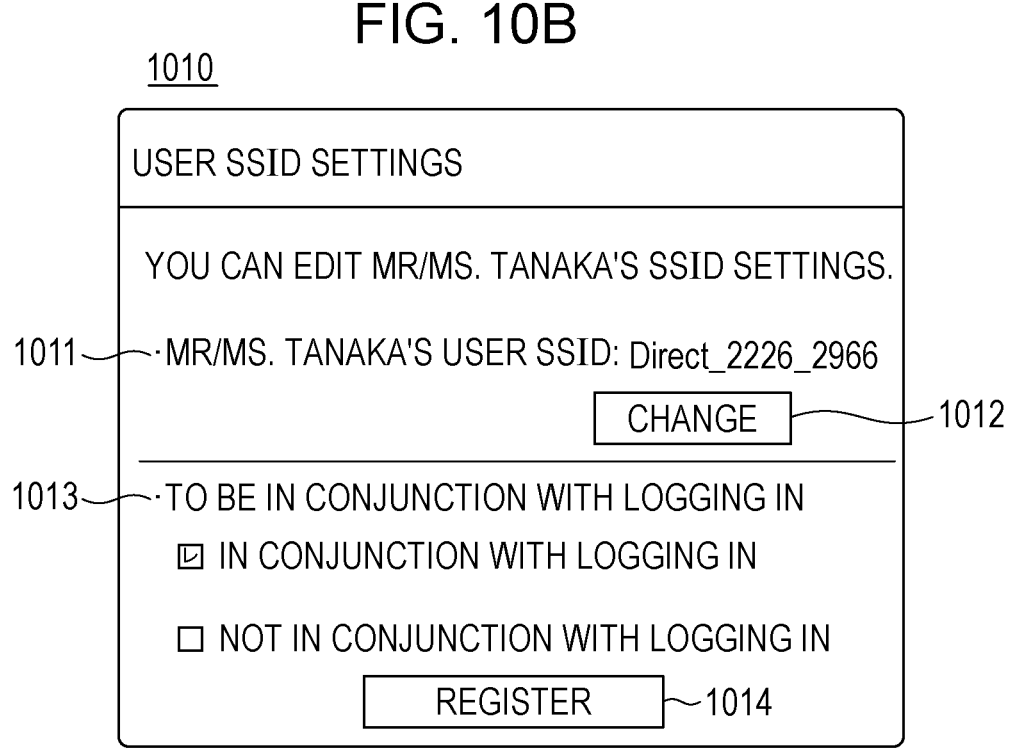
FIG. 10B is a diagram illustrating a wireless connection screen.

The setting screen 1010 illustrated in FIG. 10B is a screen for editing the settings of the user SSID and is displayed by the operating section 208. The setting screen 1010 is a screen accessible not only to the system administrator, but also to general users, and the settings of the user SSID of a user who is currently logged in to the printer 100 can be edited.

An item 1011 displays the user SSID of a user who is currently logged in. A change button 1012 is a button for changing the user SSID.

In the case of using a user SSID, an item 1013 is for setting whether to automatically start the operation in the access point mode in conjunction with the user's logging in. When a user SSID is set on the setting screen 1000 and when "In conjunction with logging in" is set on the setting screen 1010, the printer 100 automatically starts operating in the access point mode in conjunction with the user's logging in. At this time, the printer 100 uses the user SSID. In contrast, when "Not in conjunction with logging in" is set on the setting screen 1010, even when a user SSID is set on the setting screen 1000, the printer 100 does not automatically start operating in the access point mode in conjunction with the user's logging in.

A register button 1014 is a button for reflecting the settings configured on the setting screen 1010 in the printer 100. When the user presses the register button 1014, the results of the settings configured on the setting screen 1010 are stored in the HDD 204, and the settings configured on the setting screen 1010 are reflected in the printer 100.

The setting screen 1010 illustrated in FIG. 10B indicates a screen in the case where the user "Tanaka" is currently logged in to the printer 100. When the user "Sato" is currently logged in to the printer 100, the setting screen 1010 is a screen for editing the settings of the user SSID of the user "Sato".

Figure 11:
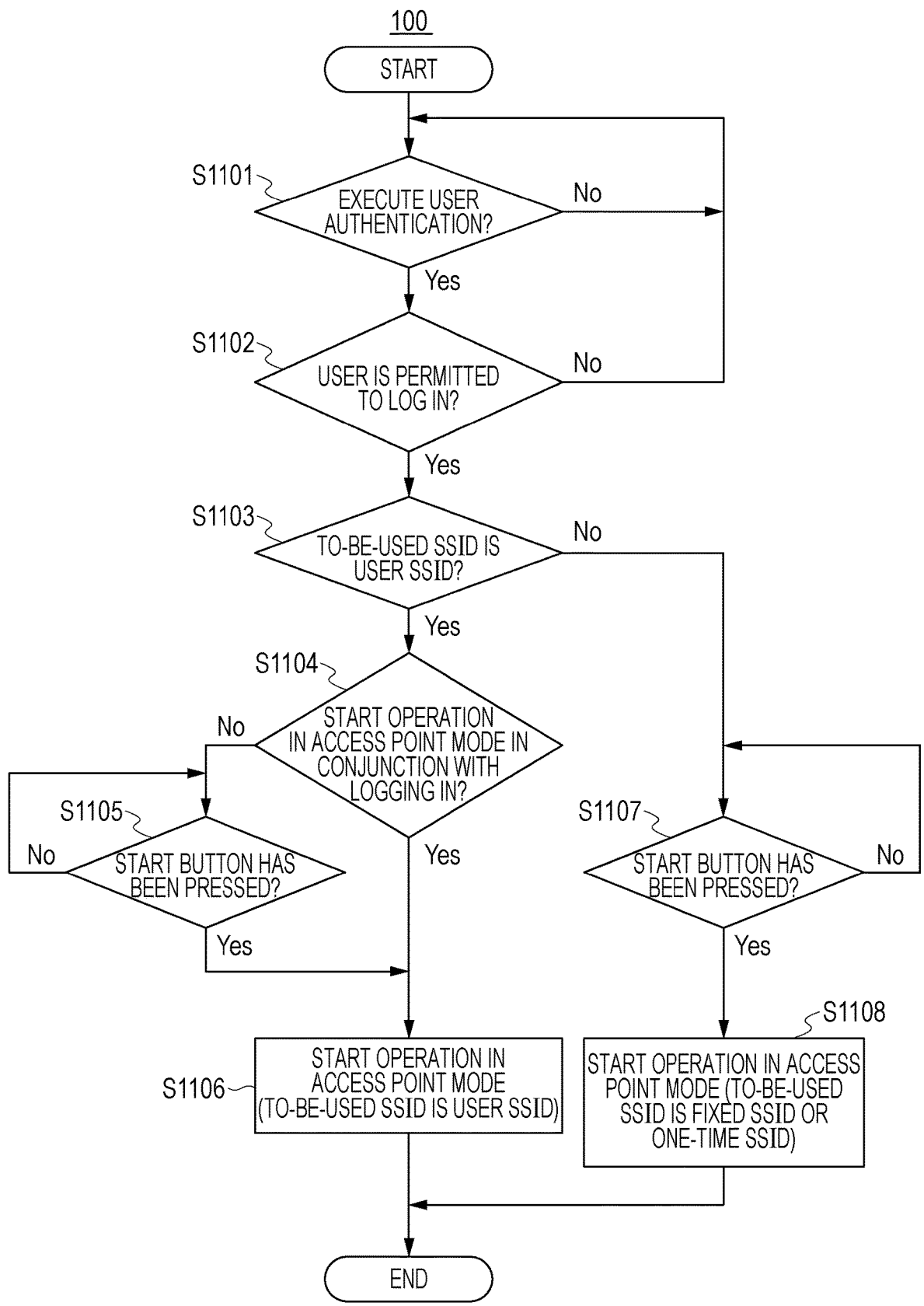
FIG. 11 is a flowchart illustrating a process of starting operation in the access point mode.

Next, a process executed by the printer 100 when the user logs in to the printer 100 and uses the access point mode will be described using a flowchart illustrated in FIG. 11. Each step illustrated in the flowchart in FIG. 11 is processed when the CPU 201 expands and executes a control program stored in a memory such as the ROM 202 or the like in the RAM 203. Alternatively, the printer 100 may be configured such that at least some of the steps of the flowchart illustrated in FIG. 11 are executed by the CPU 201, and the remaining steps are executed by a CPU (not illustrated) different from the CPU 201.

At first, in step S1101, the CPU 201 determines whether to execute user authentication. When the IC card reader 209 reads user information from an IC card, or when the user enters his/her user ID and password in the entry field 301 and the entry field 302 and presses the log-in button 303, the CPU 201 determines to execute user authentication. The process proceeds to step S1102.

Next in step S1102, the CPU 201 determines whether a user indicated by the user information is a user who is permitted to log in. This determination is done by checking whether the user information is registered in the user management table 900. When the user information is registered in the user management table 900 (the user authentication is successful), the process proceeds to step S1103. In contrast, when the user information is not registered in the user management table 900 (the user authentication failed), the process returns to step S1101.

Next in step S1103, the CPU 201 determines whether an SSID used in the access point mode is a user SSID. This determination is executed by checking the results of the settings configured on the setting screen 1000. When an SSID used in the access point mode is a user SSID, the process proceeds to step S1104. In contrast, when an SSID used in the access point mode is not a user SSID, the process proceeds to step S1107.

Next, step S1104 will be described. In step S1104, the CPU 201 determines whether to start the operation in the access point mode in conjunction with the user's logging in. This determination is executed by checking the results of the settings configured on the setting screen 1010, which are the user-specific settings.

When "In conjunction with logging in" is set for the user who is currently logged in, it is determined in step S1104 to start the operation in the access point mode in conjunction with the user's logging in, and the process proceeds to step S1106. In step S1106, the CPU 201 controls the wireless LAN I/F 205 to start the operation in the access point mode. The wireless LAN I/F 205 generates a user SSID corresponding to the user who is currently logged in, and starts the operation in the access point mode. For example, when the user who is currently logged in is "Tanaka", the wireless LAN I/F 205 uses the SSID "Direct 2226_2966" and starts the operation in the access point mode. For example, when the user who is currently logged in is "Sato", the wireless LAN I/F 205 uses the SSID "Direct 8219_1728" and starts the operation in the access point mode. When the to-be-used SSID setting indicates a user SSID and when "In conjunction with logging in" is set on the setting screen 1010 for the user who is currently logged in, the printer 100 automatically starts operating in the access point mode in conjunction with the user's logging in.

In contrast, when "Not in conjunction with logging in" is set for the user who is currently logged in, it is determined in step S1104 not to start the operation in the access point mode in conjunction with the user's logging in, and the process proceeds to step S1105. In step S1105, the CPU 201 determines whether the user has pressed the start button 501. When the CPU 201 detects that the user has pressed the start button 501, the process proceeds to step S1106. In step S1106, the CPU 201 controls the wireless LAN I/F 205 to start the operation in the access point mode. The wireless LAN I/F 205 generates a user SSID corresponding to the user who is currently logged in, and starts the operation in the access point mode. When "Not in conjunction with logging in" is set although the to-be-used SSID setting indicates a user SSID, the printer 100 does not start operating in the access point mode at a time point at which the user logs in.

Next, step S1107 will be described. The processing in step S1107 is executed when an SSID used in the access point mode is a fixed SSID or a one-time SSID. In step S1107, the CPU 201 determines whether the user has pressed the start button 501. When the CPU 201 detects that the user has pressed the start button 501, the process proceeds to step S1108. In step S1108, the CPU 201 controls the wireless LAN I/F 205 to start the operation in the access point mode. The wireless LAN I/F 205 generates a fixed SSID or a one-time SSID in accordance with the results of the settings configured on the setting screen 1000, and starts the operation in the access point mode. When the to-be-used SSID setting indicates a fixed SSID or a one-time SSID, the printer 100 does not start operating in the access point mode at a time point at which the user logs in.

As has been described above, the printer 100 automatically starts operating in the access point mode in conjunction with the user's logging in on condition that the settings regarding the access point mode include a user SSID. For the user, the user no longer need to separately do the job of logging in to the printer 100 and the job of inputting an instruction to start the operation in the access point mode to the printer 100. This saves the user's workload and enhances convenience.

According to the third embodiment, like the process described using the flowchart in FIG. 7, the printer 100 automatically stops operating in the access point in conjunction with the user's logging out.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus having a direct wireless communication function of performing wireless communication with an external device without using an external relay device, the communication apparatus comprising:
at least one memory that stores a set of instructions; and
at least one processor that executes the set of instructions to:
set a setting related to starting of the direct wireless communication function to either one of ON or OFF;
receive a user instruction to start the direct wireless communication function; and
control the communication apparatus to start the direct wireless communication function not based on the user instruction to start the direct wireless communication function, but in accordance with the communication apparatus being in a predetermined state in a case where the setting related to starting of the direct wireless communication function is set to ON,
wherein the direct wireless communication function is not started in accordance with the communication apparatus being in a predetermined state, but is started based on a user instruction to start the direct wireless communication function in a case where the setting related to starting of the direct wireless communication function is set to OFF.

2. The communication apparatus according to claim 1, wherein the at least one processor further executes the set of instructions to:
display, on a display unit, a screen for receiving the user instruction to start the direct wireless communication function,
wherein the user instruction to start the direct wireless communication function is received via the screen.

3. The communication apparatus according to claim 1, wherein the direct wireless communication function is a function to operate in an access point mode.

4. The communication apparatus according to claim 3, wherein the access point mode is a wireless communication mode in which the communication apparatus acts as an access point by activation of a software access point in the communication apparatus.

5. The communication apparatus according to claim 1, wherein the communication apparatus is a printer.

6. The communication apparatus according to claim 1, wherein the direct wireless communication function is a wireless communication function in which the communication apparatus is caused to function as an access point compliant with an Institute of Electrical and Electronics Engineers (IEEE) 802.11 series, and the communication apparatus communicates with an external device via the access point.

7. The communication apparatus according to claim 1, wherein the direct wireless communication function is a wireless communication function of performing direct wireless communication based on Wi-Fi Direct®.

8. A communication method comprising:
setting a setting related to starting a direct wireless communication function of a communication apparatus to either one of ON or OFF, wherein the direct wireless communication function performs wireless communication with an external device without using an external relay device;

receiving a user instruction to start the direct wireless communication function;

controlling the communication apparatus to start the direct wireless communication function not based on the user instruction to start the direct wireless communication function, but in accordance with the communication apparatus being in a predetermined state in a case where the setting related to starting of the direct wireless communication function is set to ON; and controlling the communication apparatus to start the direct wireless communication function not in accordance with the communication apparatus being in a predetermined state, but based on the user instruction to start the direct wireless communication function in a case where the setting related to starting of the direct wireless communication function is set to OFF.

9. The communication method according to claim 8, further comprising:

displaying, on a display unit, a screen for receiving the user instruction to start the direct wireless communication function, wherein the user instruction to start the direct wireless communication function is received via the screen.

10. The communication method according to claim 8, wherein the direct wireless communication function is a function to operate in an access point mode.

11. The communication method according to claim 10, wherein the access point mode is a wireless communication mode in which the communication apparatus acts as an access point by activation of a software access point in the communication apparatus.

12. The communication method according to claim 8, wherein the communication apparatus is a printer.

13. The communication method according to claim 8, wherein the direct wireless communication function is a wireless communication function in which the communication apparatus is caused to function as an access point compliant with an Institute of Electrical and Electronics Engineers (IEEE) 802.11 series, and the communication apparatus communicates with an external device via the access point.

14. The communication method according to claim 8, wherein the direct wireless communication function is a wireless communication function of performing direct wireless communication based on Wi-Fi Direct®.

\* \* \* \* \*